United States Patent
Kuo et al.

(10) Patent No.: US 11,544,568 B2
(45) Date of Patent: Jan. 3, 2023

(54) METHOD FOR OPTIMIZING A DATA MODEL AND DEVICE USING THE SAME

(71) Applicant: HON HAI PRECISION INDUSTRY CO., LTD., New Taipei (TW)

(72) Inventors: Chin-Pin Kuo, New Taipei (TW);
Tung-Tso Tsai, New Taipei (TW);
Guo-Chin Sun, New Taipei (TW);
Tzu-Chen Lin, New Taipei (TW);
Wan-Jhen Lee, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 404 days.

(21) Appl. No.: 16/810,982

(22) Filed: Mar. 6, 2020

(65) Prior Publication Data
US 2020/0410356 A1 Dec. 31, 2020

(30) Foreign Application Priority Data
Jun. 28, 2019 (CN) .......................... 201910588603.0

(51) Int. Cl.
| | | |
|---|---|---|
| *G06V 10/00* | (2022.01) | |
| *G06N 3/08* | (2006.01) | |
| *G06N 20/20* | (2019.01) | |
| *G06K 9/62* | (2022.01) | |
| *G06F 17/18* | (2006.01) | |

(52) U.S. Cl.
CPC .............. *G06N 3/082* (2013.01); *G06F 17/18* (2013.01); *G06K 9/6227* (2013.01); *G06K 9/6262* (2013.01); *G06N 20/20* (2019.01)

(58) Field of Classification Search
CPC .......... G06N 3/02; G06N 3/4046; G06N 3/08;
G06N 3/0454; G06N 20/00; G06N 3/082;
G06N 20/20; G06V 10/70; G06V 10/766;
G06V 10/774; G06V 30/191; G06V
30/19147; G06T 9/002; G06T
2207/20081; G06T 2207/20084; G06K
9/6227; G06K 9/6262; G06F 17/18
See application file for complete search history.

(56) References Cited

U.S. PATENT DOCUMENTS

| | | | |
|---|---|---|---|
| 5,546,503 A * | 8/1996 | Abe ..................... | G06K 9/6281 706/25 |
| 9,390,369 B1* | 7/2016 | Sinyavskiy ............ | G06N 3/049 |
| 2012/0284213 A1* | 11/2012 | Lin .......................... | G06N 3/08 714/E11.02 |
| 2012/0323834 A1 | 12/2012 | Fujimaki | |
| 2016/0034809 A1 | 2/2016 | Trenholm et al. | |
| 2017/0147921 A1* | 5/2017 | Kasahara ............. | G06N 3/0445 |
| 2019/0073560 A1* | 3/2019 | Matei ..................... | G06V 10/82 |
| 2019/0377972 A1* | 12/2019 | Liu ......................... | G06K 9/627 |
| 2020/0057824 A1* | 2/2020 | Yeh ........................ | G06N 20/00 |
| 2020/0342652 A1* | 10/2020 | Rowell ................... | G06T 15/04 |
| 2020/0381083 A1* | 12/2020 | Chen ...................... | G16B 30/00 |
| 2022/0053005 A1* | 2/2022 | Liu ......................... | G06K 9/6215 |
| 2022/0092366 A1* | 3/2022 | Chiu ....................... | G06K 9/628 |

* cited by examiner

*Primary Examiner* — Amir Alavi
(74) *Attorney, Agent, or Firm* — ScienBiziP, P.C.

(57) ABSTRACT

A method for optimizing a data model is used in a device. The device acquires data information and selecting at least two data models according to the data information, and utilizes the data information to train the at least two data models. The device acquires each accuracy of the at least two data models, determines a target data model which has greatest accuracy between the at least two data models, and optimizes the target data model.

17 Claims, 4 Drawing Sheets

METHOD FOR OPTIMIZING A DATA MODEL AND DEVICE USING THE SAME

CROSS-REFERENCE TO RELATED APPLICATIONS

This application claims priority to Chinese Patent Application No. 201910588603.0 filed on Jun. 28, 2019, the contents of which are incorporated by reference herein.

FIELD

The subject matter herein generally relates to a method for optimizing a data model and a device using the same.

BACKGROUND

Convolution Neural Network (CNN) model is usually used as a tool in the field of analyzing images. However, selecting and adjusting the CNN model requires a professional background, and a selection of the CNN model has a great impact on the output of data, so a quick and accurate method for selecting the data model is required.

BRIEF DESCRIPTION OF THE DRAWINGS

Implementations of the present disclosure will now be described, by way of embodiment, with reference to the attached figures.

DETAILED DESCRIPTION

Figure 1:
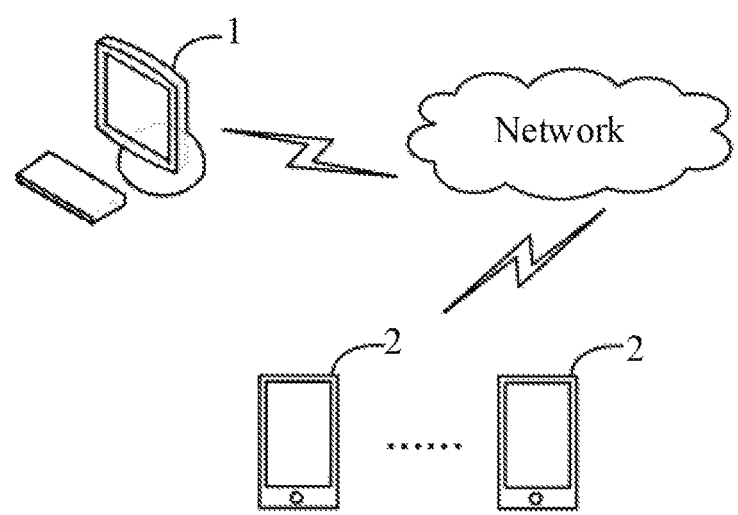
FIG. 1 is a block diagram of one embodiment of a running environment of a method for optimizing a data model.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates a running environment of a method for optimizing a data model. The method is applied in a device 1 for optimizing the data model. The device 1 connects by a network to at least one user terminal 2. The network can be a wired network or a wireless network, such as a radio, WI-FI, a cell network, a satellite network, or other network.

The device 1 is used to train and store data models. In one embodiment, the device 1 can be a personal computer, or a server. The server may be a single server, a server cluster, or a cloud server. The user terminal 2 is used to obtain an optimal data model. In one embodiment, the user terminal 2 can be an electronic device with storage and wireless communication functions, for example the user terminal 2 can be a smartphone, a tablet, a laptop convenience computer, or a desktop computer.

Figure 2:
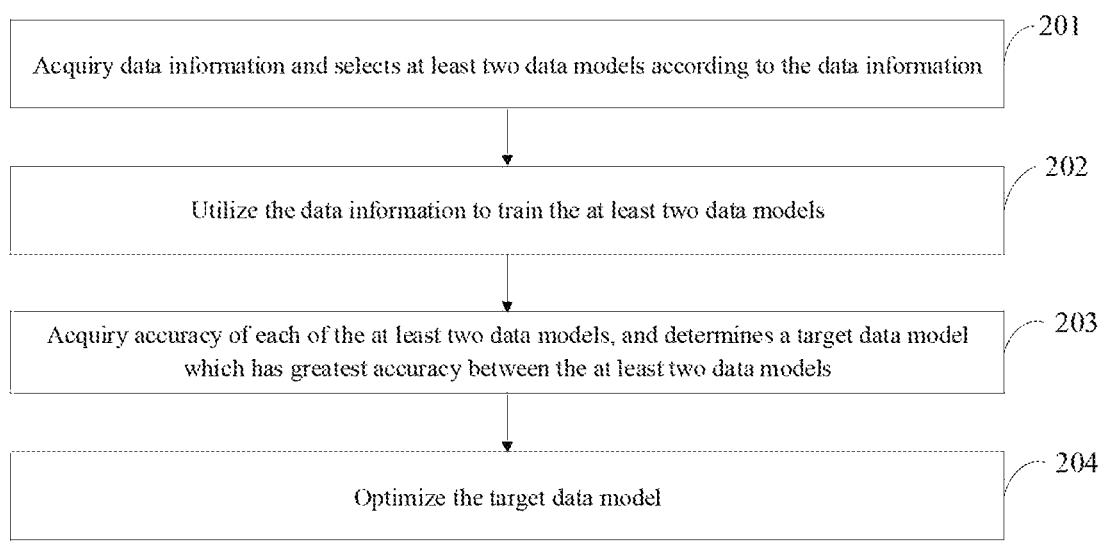
FIG. 2 is a flowchart of one embodiment of the method for optimizing a data model.

FIG. 2 illustrates a method for optimizing a data model. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, the device 1 acquires data information and selects at least two data models according to the data information.

In one embodiment, the data information can be images, sound, or texts. The data information can be used in the field of visual images, sound recognition, object recognition, or image recognition. In one embodiment, the data model includes, but is not limited to being a Residual Neural Network, an AlexNet model, a Visual Geometry Group deep convolutional neural network, an Inception model, or a data model based on wavelet moment.

In one embodiment, the device 1 selects at least two data models according to a preset rule relating to a type of the data information and an application field of the data information. In one embodiment, the preset rule defines a relationship among the types of the data information, the application field of the data information and the data model, and the data model.

For example, when acquiring an image, the device 1 determines that the type of the image is data information, and that the application field of the image is the field of the image recognition. The device 1 selects a VGG16 model and a wavelet moment-based data model according to the type of the data information and the application field of the image.

At block 202, the device 1 utilizes the data information to train the at least two data models.

In detail, the device 1 divides the data information into a training set and a verification set, selects a first data model from the at least two data models, and utilizes the training set to train the first data model, verify the trained first data model by the verification set to obtain a first verification result, and determines an accuracy of the first data model according to the first verification result. The device 1 selects a second data model from the at least two data models, and utilizes the training set to train the second data model, verify the trained second data model by the verification set to obtain a second verification result, and determines an accuracy of the second data model according to the second verification result.

In one embodiment, the data information is images. The device 1 divides images into the verification result and the training set, wherein 80% of images are in the training set and 20% of the images are in the validation set. In one embodiment, the device 1 imports the images in the training set into the Residual Neural Network for training, and verifies the Residual Neural Network with the images in the validation set when a training of the Residual Neural Network is complete, and determines the accuracy of the Residual Neural Network according to a verification result of the Residual Neural Network. The device 1 imports the images in the training set into the Visual Geometry Group deep convolutional neural network for training, and verifies the Visual Geometry Group deep convolutional neural network with the images in the validation set when a training of the Visual Geometry Group deep convolutional neural network is complete, and determines the accuracy of the Visual Geometry Group deep convolutional neural network according to a verification result of the Visual Geometry Group deep convolutional neural network.

At block 203, the device 1 acquires accuracy of each of the at least two data models, and determines a target data model which has greatest accuracy between the at least two data models.

In one embodiment, the device 1 compares the accuracy of the first data model with the accuracy of the second data model, and determines that the first data model is the target data model when the accuracy of the first data model is greater than that of the second data model. The device 1 can determine that the second data model is the target data model when the accuracy of the second data model is greater than that of the first data model.

At block 204, the device 1 optimizes the target data model.

In one embodiment, the device 1 reduces the number of neurons per layer in the target data model at a preset proportion. In one embodiment, when the target data model is a Visual Geometry Group deep convolutional neural network, the device 1 reduces the number of neurons per layer in the target data model by 5%.

In one embodiment, the device 1 optimizes the target data model to get a first optimized data model, and optimizes the first optimized data model to get a second optimized data model. The device 1 further acquires the validation set, verifies the second optimized data model by the validation set to obtain a third verification result, and determines an accuracy of the second optimized data model according to the third verification result. The device 1 determines whether the accuracy of the second optimized data model is greater than the accuracy of the target data model, outputs the second optimized data model when the accuracy of the second optimized data model is greater than that of the target data model, and optimizes the second optimized data model to get a third optimized data model when the accuracy of the second optimized data model is not greater than that of the target data model.

In one embodiment, the device 1 utilizes images of the validation set to verify the Visual Geometry Group deep convolutional neural network to obtain a verification result of the Visual Geometry Group deep convolutional neural network, and determines an accuracy of the optimized Visual Geometry Group deep convolutional neural network according to the verification result of the Visual Geometry Group deep convolutional neural network. The accuracy of a target Visual Geometry Group deep convolutional neural network is compared with the accuracy of the optimized Visual Geometry Group deep convolutional neural network.

In one embodiment, the device 1 outputs an optimized data model when the accuracy of the optimized data model is greater than the accuracy of the target data model. In one embodiment, the device 1 outputs the optimized Visual Geometry Group deep convolutional neural network when the accuracy of the optimized Visual Geometry Group deep convolutional neural network is greater than the accuracy of the target Visual Geometry Group deep convolutional neural network.

In one embodiment, the device 1 outputs an optimized data model to a user terminal. The user terminal includes, but is not limited to, a smartphone, a tablet computer, a laptop, or a desktop computer. In one embodiment, when the accuracy of the optimized data model is not greater than the accuracy of the target data model, the device 1 further optimizes the optimized data model to get a second data model.

In one embodiment, the device 1 obtains weights of every layer of neurons in the optimized data model, determines whether the weights of every layer of neurons are consistent with a Gaussian distribution, retains the layer of neurons when the weight of the layer of neurons are consistent with the Gaussian distribution, and adjusts the layer of neurons when the weights of the layer of neurons are not consistent with the Gaussian distribution.

In one embodiment, the device 1 determines the layer of neurons which have weights not conforming to the Gaussian distribution, obtains the weights corresponding to the determined layer of neurons, sorts the determined layer of neurons according to the weights, and removes the neurons with a weight smaller than a preset weight at a preset removal ratio.

The device 1 further acquires the validation set, verifies the second optimized data model by the validation set to obtain a third verification result, and determines an accuracy of the second optimized data model according to the third verification result. The device 1 determines whether the accuracy of the second optimized data model is greater than the accuracy of the data model, outputs the second optimized data model when the accuracy of the second optimized data model is greater than that of the data model, and optimizes the second optimized data model to get a third optimized data model. In one embodiment, the preset removal ratio corresponding to the neurons with a weight smaller than the preset weight can be adjusted when optimizing the second optimized data model.

In one embodiment, when the accuracy of the first optimized Visual Geometry Group deep convolutional neural network is less than that of the target Visual Geometry Group deep convolutional neural network, the device 1 analyzes the weights between each layer of neurons in the first optimized Visual Geometry Group deep convolutional neural network. The device 1 can thus determine whether the weights of each layer of neurons are consistent with the Gaussian distribution. In one embodiment, the device 1 analyzes the weights between each layer of neurons in the first optimized Visual Geometry Group deep convolutional neural network by a histogram testing method, a K-S value testing method, a skewness value testing method, or a Q-Q diagram testing method. For example, the device 1 analyzes the weights between each layer of neurons in the first optimized Visual Geometry Group deep convolutional neural network by the K-S value testing method to determine whether the weights of the fifth layer of neurons are consistent with the Gaussian distribution. When the weights of the fifth layer of neurons are not consistent with the Gaussian distribution, the device 1 determines the original values of weights of the fifth layer of neurons of the target Visual Geometry Group deep convolutional neural network, sorts the fifth layer of neurons according to the determined weights, and removes the neurons with small weight at the preset removal ratio. The device 1 further acquires the validation set, verifies the second optimized Visual Geometry Group deep convolutional neural network by the validation set to obtain a third verification result, and determines an accuracy of the second optimized Visual Geometry Group deep convolutional neural network according to the third verification result. The device 1 determines whether the accuracy of the second optimized Visual Geometry Group deep convolutional neural network is greater than the accuracy of the target Visual Geometry Group deep convolutional neural network, and outputs the second optimized Visual Geometry Group deep convolutional neural network when the accuracy of the second optimized Visual Geometry Group deep convolutional neural network is greater than that of the target Visual Geometry Group deep convolutional neural network. The second optimized Visual Geometry Group deep convolutional neural network is optimized to get a third optimized Visual Geometry Group deep convolutional neural network.

Figure 3:
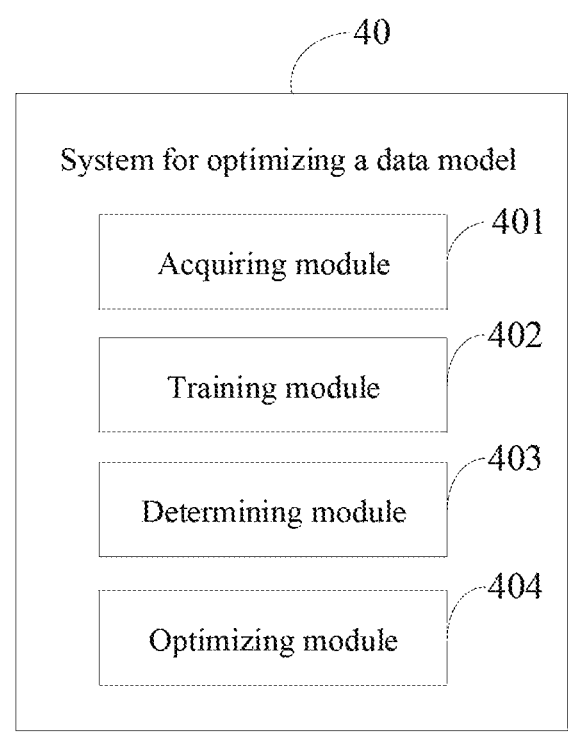
FIG. 3 is a block diagram of one embodiment of a system for optimizing a data model.

FIG. 3 illustrates a system 10 for optimizing a data model. In at least one exemplary embodiment, according to the functions it performs, the deep learning program configuration system 10 can be divided into a plurality of functional modules. The functional modules perform the steps 201-204 in the embodiment of FIG. 2 to perform the functions of optimizing data models. The system 10 includes, but is not limited to, an acquiring module 101, a training module 102, a determining module 103, and an optimizing module 104. The modules 101-104 of the system 10 can be collections of software instructions. In one embodiment, the acquiring module 101, the training module 102, the determining module 103, and the optimizing module 104 are applied in the device 1.

The acquiring module 101 acquires data information and selects at least two data models according to the data information.

In one embodiment, the data information can be images, sound, or texts. The data information can be used in the field of visual images, sound recognition, object recognition, or image recognition. In one embodiment, the data model includes, but is not limited to being, a Residual Neural Network, an AlexNet model, a Visual Geometry Group deep convolutional neural network, an Inception model, or a data model based on wavelet moment.

In one embodiment, the acquiring module 101 selects at least two data models according to a preset rule relating to a type of the data information and an application field of the data information. In one embodiment, the preset rule defines a relationship among the types of the data information, the application field of the data information and the data model, and the data model.

For example, when acquiring an image, the acquiring module 101 determines that the type of the image is data information, and that the application field of the image is the field of the image recognition. The acquiring module 101 selects a VGG16 model and a wavelet moment-based data model according to the type of the data information and the application field of the image.

The training module 102 utilizes the data information to train the at least two data models.

In detail, the training module 102 divides the data information into a training set and a verification set, selects a first data model from the at least two data models, and utilizes the training set to train the first data model. The training of the first data model is verified by the verification set to obtain a first verification result, and an accuracy of the first data model according to the first verification result is determined. The training module 102 selects a second data model from the at least two data models, and utilizes the training set to train the second data model, verify the trained second data model by the verification set to obtain a second verification result, and determines an accuracy of the second data model according to the second verification result.

In one embodiment, the data information is images. The training module 102 divides images into the verification result and the training set, wherein 80% of images are in the training set and 20% of the images are in the validation set. In one embodiment, the training module 102 imports the images in the training set into the Residual Neural Network for training, and verifies the Residual Neural Network with the images in the validation set when a training of the Residual Neural Network is complete. The accuracy of the Residual Neural Network is determined according to a verification result of the Residual Neural Network. The training module 102 imports the images in the training set into the Visual Geometry Group deep convolutional neural network for training, and verifies the Visual Geometry Group deep convolutional neural network with the images in the validation set when a training of the Visual Geometry Group deep convolutional neural network is complete. The accuracy of the Visual Geometry Group deep convolutional neural network is determined according to a verification result of the Visual Geometry Group deep convolutional neural network.

The determining module 103 acquires accuracy of each of the at least two data models, and determines a target data model which has greater accuracy between the at least two data models.

In one embodiment, the determining module 103 compares the accuracy of the first data model with the accuracy of the second data model, determines that the first data model is the target data model when the accuracy of the first data model is greater than that of the second data model. The second data model is determined as the target data model when the accuracy of the second data model is greater than that of the first data model.

The optimizing module 104 optimizes the target data model.

In one embodiment, the optimizing module 104 reduces the number of neurons per layer in the target data model at a preset proportion. In one embodiment, when the target data model is a Visual Geometry Group deep convolutional neural network, the optimizing module 104 reduces the number of neurons per layer in the target data model by 5%.

In one embodiment, the device 1 optimizes the target data model to get a first optimized data model, determines whether an accuracy of the first optimized data model is greater than an accuracy of the target data model, and outputs the first data model when the accuracy of the first data model is greater than the accuracy of the target data model. The first optimized data model is optimized to get a second optimized data model when the accuracy of the first data model is not greater than the accuracy of the target data model.

The device 1 further acquires the validation set, verifies the target data model by the validation set to obtain a third verification result, and determines an accuracy of the first optimized data model according to the third verification result. The device 1 determines whether the accuracy of the first optimized data model is greater than the accuracy of the target data model, outputs the first optimized data model when the accuracy of the second optimized data model is greater than that of the target data model, and optimizes the first optimized data model to get the second optimized data model when the accuracy of the first optimized data model is not greater than that of the target data model.

In one embodiment, the optimizing module 104 utilizes images of the validation set to verify the Visual Geometry Group deep convolutional neural network to obtain a verification result of the Visual Geometry Group deep convolutional neural network, and determines an accuracy of the optimized Visual Geometry Group deep convolutional neural network according to the verification result of the Visual Geometry Group deep convolutional neural network. The accuracy of a target Visual Geometry Group deep convolutional neural network is compared with the accuracy of the optimized Visual Geometry Group deep convolutional neural network.

In one embodiment, the optimizing module 104 outputs an optimized data model when the accuracy of the optimized data model is greater than the accuracy of the target data model. In one embodiment, the optimizing module 104 outputs the optimized Visual Geometry Group deep convolutional neural network when the accuracy of the optimized Visual Geometry Group deep convolutional neural network is greater than the accuracy of the target Visual Geometry Group deep convolutional neural network.

In one embodiment, the optimizing module 104 outputs an optimized data model to a user terminal. The user terminal includes, but is not limited to, a smartphone, a tablet computer, a laptop, or a desktop computer. In one embodiment, when the accuracy of the optimized data model is not greater than the accuracy of the target data model, the optimizing module 104 further optimizes the optimized data model to get a second data model.

In one embodiment, the optimizing module 104 obtains weights of every layer of neurons in the optimized data model, determines whether the weights of every layer of neurons are consistent with a Gaussian distribution, retains the layer of neurons when the weight of the layer of neurons are consistent with the Gaussian distribution, and adjusts the layer of neurons when the weights of the layer of neurons are not consistent with the Gaussian distribution.

In one embodiment, the optimizing module 104 determines the layer of neurons which have weights not conforming to the Gaussian distribution, obtains the weight corresponding to the determined layer of neurons, sorts the determined layer of neurons according to the weight, and removes the neurons with small weight at a preset removal ratio.

The optimizing module 104 further acquires the validation set, verifies the second optimized data model by the validation set to obtain a third verification result, and determines an accuracy of the second optimized data model according to the third verification result. The optimizing module 104 determines whether the accuracy of the second optimized data model is greater than the accuracy of the data model, outputs the second optimized data model when the accuracy of the second optimized data model is greater than that of the data model, and optimizes the second optimized data model to get a third optimized data model. In one embodiment, the preset removal ratio corresponding to the neurons with small weight can be adjusted when optimizing the second optimized data model.

In one embodiment, when the accuracy of the first optimized Visual Geometry Group deep convolutional neural network is less than that of the target Visual Geometry Group deep convolutional neural network, the optimizing module 104 analyzes the weights between each layer of neurons in the first optimized Visual Geometry Group deep convolutional neural network to determine whether the weights of each layer of neurons are consistent with the Gaussian distribution. In one embodiment, the optimizing module 104 analyzes the weights between each layer of neurons in the first optimized Visual Geometry Group deep convolutional neural network by a histogram testing method, a K-S value testing method, a skewness value testing method, or a Q-Q diagram testing method. For example, the optimizing module 104 analyzes the weights between each layer of neurons in the first optimized Visual Geometry Group deep convolutional neural network by the K-S value testing method to determine whether the weights of the fifth layer of neurons are consistent with the Gaussian distribution. When the weights of the fifth layer of neurons are not consistent, the optimizing module 104 determines the original values of weights of the fifth layer of neurons of the target Visual Geometry Group deep convolutional neural network, sorts the fifth layer of neurons according to the determined weights, and removes the neurons with small weight at the preset removal ratio. The optimizing module 104 further acquires the validation set, verifies the second optimized Visual Geometry Group deep convolutional neural network by the validation set to obtain a third verification result, and determines an accuracy of the second optimized Visual Geometry Group deep convolutional neural network according to the third verification result. The optimizing module 104 determines whether the accuracy of the second optimized Visual Geometry Group deep convolutional neural network is greater than the accuracy of the target Visual Geometry Group deep convolutional neural network, outputs the second optimized Visual Geometry Group deep convolutional neural network when the accuracy of the second optimized Visual Geometry Group deep convolutional neural network is greater than that of the target Visual Geometry Group deep convolutional neural network, and optimizes the second optimized Visual Geometry Group deep convolutional neural network to get a third optimized Visual Geometry Group deep convolutional neural network.

Figure 4:
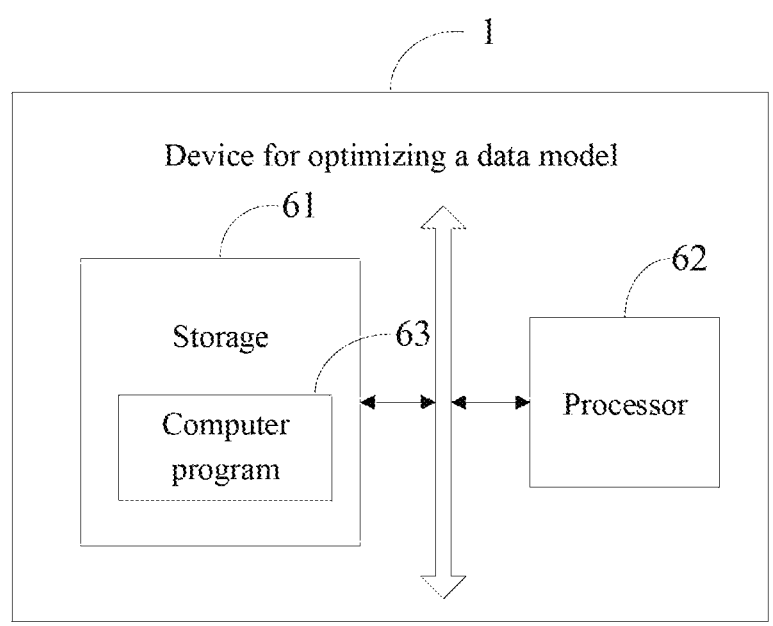
FIG. 4 is a schematic diagram of one embodiment of a device for optimizing a data model.

FIG. 4 illustrates the device 1 for optimizing a data model. The device 1 includes a storage 20, a processor 30, and a computer program 40 stored in the storage 20 and executed by the processor 30. When the processor 30 executes the computer program 40, the steps in the embodiment of the method for optimizing a data model are implemented, for example, steps 201 to 204 as shown in FIG. 2. Alternatively, when the processor 30 executes the computer program 40, the functions of the modules in the embodiment of the system for optimizing a data model are implemented, for example, modules 101-104 shown in FIG. 3.

In one embodiment, the computer program 40 can be partitioned into one or more modules/units that are stored in the memory 20 and executed by the processor 30. The one or more modules/units may be a series of computer program instruction segments capable of performing a particular function, and the instruction segments describe the execution of the computer program 40 in the device 1. For example, the computer program 40 can be divided into the acquiring module 101, the training module 102, the determining module 103, and the optimizing module 104 as shown in FIG. 3.

FIG. 4 shows only one example of the device 1. There are no limitations of the device 1, and other examples may include more or less components than those illustrated, or some components may be combined, or have a different arrangement. The components of the device 1 may also include input devices, output devices, communication units, network access devices, buses, and the like.

The processor 30 can be a central processing unit (CPU), and also include other general-purpose processors, a digital signal processor (DSP), and application specific integrated circuit (ASIC), Field-Programmable Gate Array (FPGA) or other programmable logic device, discrete gate or transistor logic device, discrete hardware components, etc. The processor 30 may be a microprocessor or the processor may be any conventional processor or the like. The processor 30 is the control center of the device 1, and connects the device 1 by using various interfaces and lines.

The storage 20 stores data and programs of the device 1. For example, the storage 20 can store the system 10 for optimizing data models. In at least one exemplary embodiment, the storage 20 can include various types of non-transitory computer-readable storage mediums. For example, the storage 20 can be an internal storage system, such as a flash memory, a random access memory for temporary storage of information, and/or a read-only memory for permanent storage of information. The storage 20 can also be an external storage system, such as a hard disk, a storage card, or a data storage medium.

In one embodiment, the modules/units integrated in the device 1 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A device for optimizing the data model comprising:
a processor; and
a non-transitory storage medium coupled to the processor and configured to store a plurality of instructions, which cause the device to:
    acquire data information and select at least two data models according to the data information;
    utilize the data information to train the at least two data models;
    acquire accuracies of each of the at least two data models, and determine a target data model which has a greatest accuracy between the at least two data models; and
    optimize the target data model to obtain a first optimized data model;
    determine whether an accuracy of the first optimized data model is greater than an accuracy of the target data model;
    output the first data model if the accuracy of the first data model is greater than the accuracy of the target data model; and
    optimize the first optimized data model to obtain a second optimized data model if the accuracy of the first data model is not greater than the accuracy of the target data model.

2. The device as recited in claim 1, wherein the plurality of instructions are further configured to cause the device to:
reduce a quantity of neurons per layer in the target data model at a preset proportion.

3. The device as recited in claim 1, wherein the plurality of instructions are further configured to cause the device to:
divide the data information into a training set and a verification set;
select a first data model from the least two data models, and utilize the training set to train the first data model;
verify the trained first data model by the verification set to obtain a first verification result, and determine an accuracy of the first data model according to the first verification result;
select a second data model from the at least two data models, and utilize the training set to train the second data model;
verify the trained second data model by the verification set to obtain a second verification result; and
determine an accuracy of the second data model according to the second verification result.

4. The device as recited in claim 1, wherein the plurality of instructions are further configured to cause the device to:
obtain weights of every layer of neurons in the first optimized data model;
determine whether the weights of every layer of neurons are consistent with a gaussian distribution;
retain the layer of neurons if the weights of the layer of neurons are consistent with the gaussian distribution; and
adjust the layer of neurons if the weights of the layer of neurons are not consistent with the gaussian distribution.

5. The device as recited in claim 4, wherein the plurality of instructions are further configured to cause the device to:
determine the layer of neurons which have weights not conforming to the Gaussian distribution;
obtain the weights corresponding to the determined layer of neurons;

sort the layer of neurons according to the weights; and
remove the neurons with a weight smaller than a preset weight at a preset removal ratio.

6. The device as recited in claim 5, wherein the plurality of instructions are further configured to cause the device to:
acquire the validation set;
verify the second optimized data model by the validation set to obtain a verification result;
determine an accuracy of the second optimized data model according to the verification result;
determine whether the accuracy of the second optimized data model is greater than the accuracy of the target data model;
output the second optimized data model if the accuracy of the second optimized data model is greater than the accuracy of the target data model; and
optimize the second optimized data model to obtain a third optimized data model if the accuracy of the second optimized data model is not greater than the accuracy of the target data model.

7. A method for optimizing a data model comprising:
acquiring data information and selecting at least two data models according to the data information;
utilizing the data information to train the at least two data models;
acquiring each accuracy of the at least two data models, and determining a target data model which has greatest accuracy between the at least two data models; and
optimizing the target data model to obtain a first optimized data model;
determining whether an accuracy of the first optimized data model is greater than an accuracy of the target data model;
outputting the first data model if the accuracy of the first data model is greater than the accuracy of the target data model; and
optimizing the first optimized data model to obtain a second optimized data model if the accuracy of the first data model is not greater than the accuracy of the target data model.

8. The method as recited in claim 7, further comprising:
reducing a quantity of neurons per layer in the target data model at a preset proportion.

9. The method as recited in claim 7, further comprising:
dividing the data information into a training set and a verification set;
selecting a first data model of the at least two data models, and utilizing the training set to train the first data model;
verifying the trained first data model by the verification set to obtain a first verification result, and determining an accuracy of the first data model according to the first verification result;
selecting a second data model from the at least two data models, and utilizing the training set to train the second data model;
verifying the trained second data model by the verification set to obtain a second verification result; and
determining an accuracy of the second data model according to the second verification result.

10. The method as recited in claim 7, further comprising:
obtaining weights of every layer of neurons in the first optimized data model;
determining whether the weights of every layer of neurons are consistent with a gaussian distribution;
retaining the layer of neurons if the weights of the layer of neurons are consistent with the gaussian distribution; and
adjusting the layer of neurons if the weights of the layer of neurons are not consistent with the gaussian distribution.

11. The method as recited in claim 10, further comprising:
determining the layer of neurons which have weights not conforming to the Gaussian distribution;
obtaining the weights corresponding to the determined layer of neurons;
sorting the layer of neurons according to the weights; and
removing the neurons with a weight smaller than a preset weight at a preset removal ratio.

12. The method as recited in claim 11, further comprising:
acquiring the validation set;
verifying the second optimized data model by the validation set to obtain a verification result;
determines an accuracy of the second optimized data model according to the verification result;
determining whether the accuracy of the second optimized data model is greater than the accuracy of the target data model;
outputting the second optimized data model if the accuracy of the second optimized data model is greater than the accuracy of the target data model; and
optimizing the second optimized data model to obtain a third optimized data model if the accuracy of the second optimized data model is not greater than the accuracy of the target data model.

13. A non-transitory storage medium having stored thereon instructions that, when executed by at least one processor of a device for optimizing a data model, causes the least one processor to execute instructions of a method for optimizing a data model, the method comprising:
acquiring data information and selecting at least two data models according to the data information;
utilizing the data information to train the at least two data models;
acquiring each accuracy of the at least two data models, and determining a target data model which has greatest accuracy between the at least two data models; and
optimizing the target data model to obtain a first optimized data model;
determining whether an accuracy of the first optimized data model is greater than an accuracy of the target data model;
outputting the first data model if the accuracy of the first data model is greater than the accuracy of the target data model; and
optimizing the first optimized data model to obtain a second optimized data model if the accuracy of the first data model is not greater than the accuracy of the target data model.

14. The non-transitory storage medium as recited in claim 13, wherein the method is further comprising:
dividing the data information into a training set and a verification set;
selecting a first data model from the at least two data models, and utilize the training set to train the first data model;
verifying the trained first data model by the verification set to obtain a first verification result, and determine an accuracy of the first data model according to the first verification result;

selecting a second data model from the at least two data models, and utilizing the training set to train the second data model;

verifying the trained second data model by the verification set to obtain a second verification result; and determining an accuracy of the second data model according to the second verification result.

15. The non-transitory storage medium as recited in claim 13, wherein the method is further comprising:

obtaining weights of every layer of neurons in the first optimized data model;

determining whether the weights of every layer of neurons are consistent with a gaussian distribution;

retaining the layer of neurons if the weights of the layer of neurons are consistent with the gaussian distribution; and adjusting the layer of neurons if the weights of the layer of neurons are not consistent with the gaussian distribution.

16. The non-transitory storage medium as recited in claim 15, wherein the method is further comprising:

determining the layer of neurons which have weights not conforming to the gaussian distribution;

obtaining the weights corresponding to the determined layer of neurons;

sorting the layer of neurons according to the weights; and removing the neurons with a weight smaller than a preset weight at a preset removal ratio.

17. The non-transitory storage medium as recited in claim 16, wherein the method is further comprising:

acquiring the validation set;

verifying the second optimized data model by the validation set to obtain a verification result;

determining an accuracy of the second optimized data model according to the verification result;

determining whether the accuracy of the second optimized data model is greater than the accuracy of the target data model;

output the second optimized data model if the accuracy of the second optimized data model is greater than the accuracy of the target data model; and optimizing the second optimized data model to obtain a third optimized data model if the accuracy of the second optimized data model is not greater than the accuracy of the target data model.

\* \* \* \* \*